US009393634B2

(12) United States Patent
Lee

(10) Patent No.: US 9,393,634 B2
(45) Date of Patent: Jul. 19, 2016

(54) POWER SUPPLY DEVICE AND METHOD OF ASSEMBLING THE POWER SUPPLY DEVICE

(71) Applicant: Cheng Uei Precision Industry Co., Ltd., New Taipei (TW)

(72) Inventor: James Cheng Lee, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 189 days.

(21) Appl. No.: 14/448,681

(22) Filed: Jul. 31, 2014

(65) Prior Publication Data
US 2015/0255763 A1 Sep. 10, 2015

(30) Foreign Application Priority Data

Mar. 4, 2014 (TW) .............................. 103107214 A

(51) Int. Cl.
B23K 1/002 (2006.01)
H02J 7/00 (2006.01)
G04C 10/00 (2006.01)
H01M 2/10 (2006.01)
H01M 2/02 (2006.01)

(52) U.S. Cl.
CPC ................ *B23K 1/002* (2013.01); *G04C 10/00* (2013.01); *H01M 2/1022* (2013.01); *H02J 7/0068* (2013.01); *H01M 2/1094* (2013.01); *H01M 2002/0205* (2013.01)

(58) Field of Classification Search
CPC ................... H01M 2002/0205; H01M 2/1022; H01M 2/1094; H02J 7/0068; B23K 1/002; G04C 10/00
See application file for complete search history.

(56) References Cited

U.S. PATENT DOCUMENTS

| 3,876,897 | A | * | 4/1975 | Geyer | H01J 29/026 313/367 |
| 5,009,222 | A | * | 4/1991 | Her | A45C 11/22 206/811 |
| 5,019,767 | A | * | 5/1991 | Shirai | H01M 2/105 224/902 |
| 5,432,399 | A | * | 7/1995 | Nagasawa | H01J 5/54 313/112 |
| 5,521,794 | A | * | 5/1996 | Hargrave | H01M 2/1044 174/535 |
| 5,640,669 | A | * | 6/1997 | Harada | B22F 3/1137 419/2 |
| 5,856,041 | A | * | 1/1999 | Inoue | H01M 2/06 429/182 |
| 9,132,058 | B2 | * | 9/2015 | Imboden | A61H 19/00 |

(Continued)

*Primary Examiner* — Helen Rossoshek
(74) *Attorney, Agent, or Firm* — Lin & Associates Intellectual Property, Inc.

(57) ABSTRACT

A power supply device includes a main body defining a receiving cavity which has an opening, a battery and a metallic plate both disposed in the receiving cavity, a metallic ring mounted around the opening, and a cover disposed at the opening. The metallic ring is positioned between the cover and the main body and heated by the high-frequency heating for fusion of the cover and the main body to seal up the battery in the receiving cavity. The metallic plate is located between the battery and acting parts by the high-frequency heating to separate the energy of the high-frequency heating from the battery. The main body or the cover are provided with a connecting element of which one end is exposed in the receiving cavity to electrically connect the battery and the other end is exposed outside the power supply device to electrically connect an external electronic product.

9 Claims, 5 Drawing Sheets

(56) References Cited

U.S. PATENT DOCUMENTS

| | | | | |
|---|---|---|---|---|
| 9,159,969 B2* | 10/2015 | Ahn | | H01M 2/0207 |
| 2003/0152824 A1* | 8/2003 | Kasuga | | H01M 10/286 |
| | | | | 429/94 |
| 2004/0208991 A1* | 10/2004 | Sinsel | | B05D 1/265 |
| | | | | 427/211 |
| 2005/0279661 A1* | 12/2005 | Hodges | | H01H 9/0242 |
| | | | | 206/320 |
| 2006/0176014 A1* | 8/2006 | Moon | | H01M 2/1061 |
| | | | | 320/112 |
| 2006/0244416 A1* | 11/2006 | Yong | | H01M 2/0215 |
| | | | | 320/112 |
| 2007/0224501 A1* | 9/2007 | Yoon | | H01M 2/0202 |
| | | | | 429/176 |
| 2008/0149624 A1* | 6/2008 | Tamura | | H02J 7/00 |
| | | | | 219/685 |
| 2008/0211302 A1* | 9/2008 | Hirota | | B25J 13/02 |
| | | | | 307/1 |
| 2010/0196745 A1* | 8/2010 | Ahn | | H01M 2/0207 |
| | | | | 429/7 |
| 2011/0216531 A1* | 9/2011 | Yeh | | F21L 4/08 |
| | | | | 362/183 |
| 2012/0222610 A1* | 9/2012 | Kagami | | G01K 11/006 |
| | | | | 116/207 |
| 2013/0260214 A1* | 10/2013 | Ueda | | H01M 10/0585 |
| | | | | 429/162 |
| 2013/0333570 A1* | 12/2013 | Kamperschroer | | A61L 9/014 |
| | | | | 96/108 |
| 2014/0176076 A1* | 6/2014 | Momo | | H01M 10/46 |
| | | | | 320/128 |
| 2015/0241917 A1* | 8/2015 | Seok | | A61B 5/681 |
| | | | | 361/679.03 |

* cited by examiner

Providing a main body, a battery, a metallic plate and a cover, defining a contact surface of the main body and forming a receiving cavity in the main body and an opening through the contact surface, equipping a connecting element in the main body or the cover, assembling the battery and the metallic plate into the receiving cavity with the battery electrically connecting with the connecting element

Providing and mounting a metallic ring around the opening of the receiving cavity, and then placing the cover at the opening of the receiving cavity to seal up the receiving cavity and retain the battery, the metallic plate and the metallic ring

Heating the metallic ring by the high-frequency heating to fuse the cover and the main body together to seal up the battery in the receiving cavity, wherein the metallic plate is located between the battery and acting parts by the high-frequency heating to separate the energy of the high-frequency heating from the battery

FIG. 4

Providing a main body, a battery, a metallic plate and a cover, defining a contact surface of the main body and forming a receiving cavity in the main body and an opening through the contact surface, equipping a connecting element in the main body or the cover, providing a loading plate and assembling the battery between the loading plate and the metallic plate into one unit, then placing the one unit in the receiving cavity of the main body with the battery electrically connecting with the connecting element

↓

Providing and mounting a metallic ring around the opening of the receiving cavity, and then placing the cover at the opening of the receiving cavity to seal up the receiving cavity and retain the one unit and the metallic ring

↓

Heating the metallic ring by the high-frequency heating to fuse the cover and the main body together to seal up the battery in the receiving cavity, wherein the metallic plate is located between the battery and acting parts by the high-frequency heating to separate the energy of the high-frequency heating from the battery

FIG. 5

POWER SUPPLY DEVICE AND METHOD OF ASSEMBLING THE POWER SUPPLY DEVICE

CROSS-REFERENCE TO RELATED APPLICATION

The present application is based on, and claims priority from, Taiwan Patent Application No. 103107214, filed Mar. 4, 2014, the disclosure of which is hereby incorporated by reference herein in its entirety.

BACKGROUND OF THE INVENTION

1. Field of the Invention

The present invention relates to a power supply device, and more particularly to a water-proof power supply device and a method of assembling the power supply device.

2. The Related Art

At present, a fastening structure used to wear a wearable electronic product on the human body mostly chooses a strip body in addition to spectacle frame, because the strip body is fit for being fixed to limbs of the human body by virtue of flexibility and resilience.

To cope with the increasing power consumption, the battery capacity of the wearable electronic product becomes crucial that will affect the wearable electronic product on the market's popularity.

So if the strip body is additionally provided with a battery, the wearable electronic product will have a longer standby time. However, the battery life will be influenced by human sweat and moisture seeping into the strip body through splicing gaps between the strip body and a cover covering the battery in the strip body. Therefore, a power supply device with a water-proof structure emerged as the times require, wherein the power supply device can both be acted as the fastening structure and receive the battery therein.

In order to completely separate human sweat and moisture, the high-frequency heating is often used. However, if the high-frequency heating is applied to the power supply device, namely the water-proof structure of the power supply device is processed by the high-frequency heating for fusion of the cover and the strip body to eliminate the splicing gaps, the battery is apt to be damaged by the energy of the high-frequency heating.

Therefore, an improved power supply device capable of overcoming the foregoing problems is required.

SUMMARY OF THE INVENTION

An object of the present invention is to provide a power supply device adapted for supplying power for an external electronic product. The power supply device includes a main body defining a receiving cavity therein, a battery disposed in the receiving cavity of the main body, a metallic plate disposed in the receiving cavity of the main body and covering the battery, a metallic ring and a cover. An inner face of the main body is designated as a contact surface through which the receiving cavity is open to form an opening. The metallic ring is mounted around the opening of the receiving cavity. The cover is disposed at the opening of the receiving cavity of the main body. The metallic ring is positioned between the cover and the main body and heated by the high-frequency heating for fusion of the cover and the main body to seal up the battery in the receiving cavity. The metallic plate is located between the battery and acting parts by the high-frequency heating to separate the energy of the high-frequency heating from the battery. The main body or the cover is provided with a connecting element of which one end is exposed in the receiving cavity to electrically connect the battery and the other end is exposed outside the power supply device to electrically connect the external electronic product.

A method of assembling the power supply device includes the following steps:

Provide the main body, the battery, the metallic plate and the cover, define the contact surface of the main body and form the receiving cavity in the main body and the opening through the contact surface, equip the connecting element in the main body or the cover, then assemble the battery and the metallic plate into the receiving cavity with the battery electrically connecting with the connecting element;

Provide and mount the metallic ring around the opening of the receiving cavity, and then place the cover at the opening of the receiving cavity to seal up the receiving cavity and retain the battery, the metallic plate and the metallic ring; and Heat the metallic ring by the high-frequency heating to fuse the cover and the main body together to seal up the battery in the receiving cavity, wherein the metallic plate is located between the battery and acting parts by the high-frequency heating to separate the energy of the high-frequency heating from the battery.

As described above, the power supply device of the present invention utilizes the high-frequency heating to heat the metallic ring for fusion of the cover and the main body close to the metallic ring so as to completely seal up the battery in the main body, so that can achieve an excellent waterproof effect. In order to overcome the damage from the energy of the high-frequency heating on the battery, the metallic plate is located between the battery and the acting parts by the high-frequency heating to separate the energy of the high-frequency heating. Moreover, the metallic plate can strengthen the power supply device to improve security of the power supply device when carrying.

BRIEF DESCRIPTION OF THE DRAWINGS

The present invention will be apparent to those skilled in the art by reading the following description thereof, with reference to the attached drawings, in which:

FIG. 4 shows steps of assembling the power supply device of FIG. 1; and

FIG. 5 further shows the steps of assembling the power supply device of FIG. 1.

DETAILED DESCRIPTION OF THE EMBODIMENT

Figure 1:
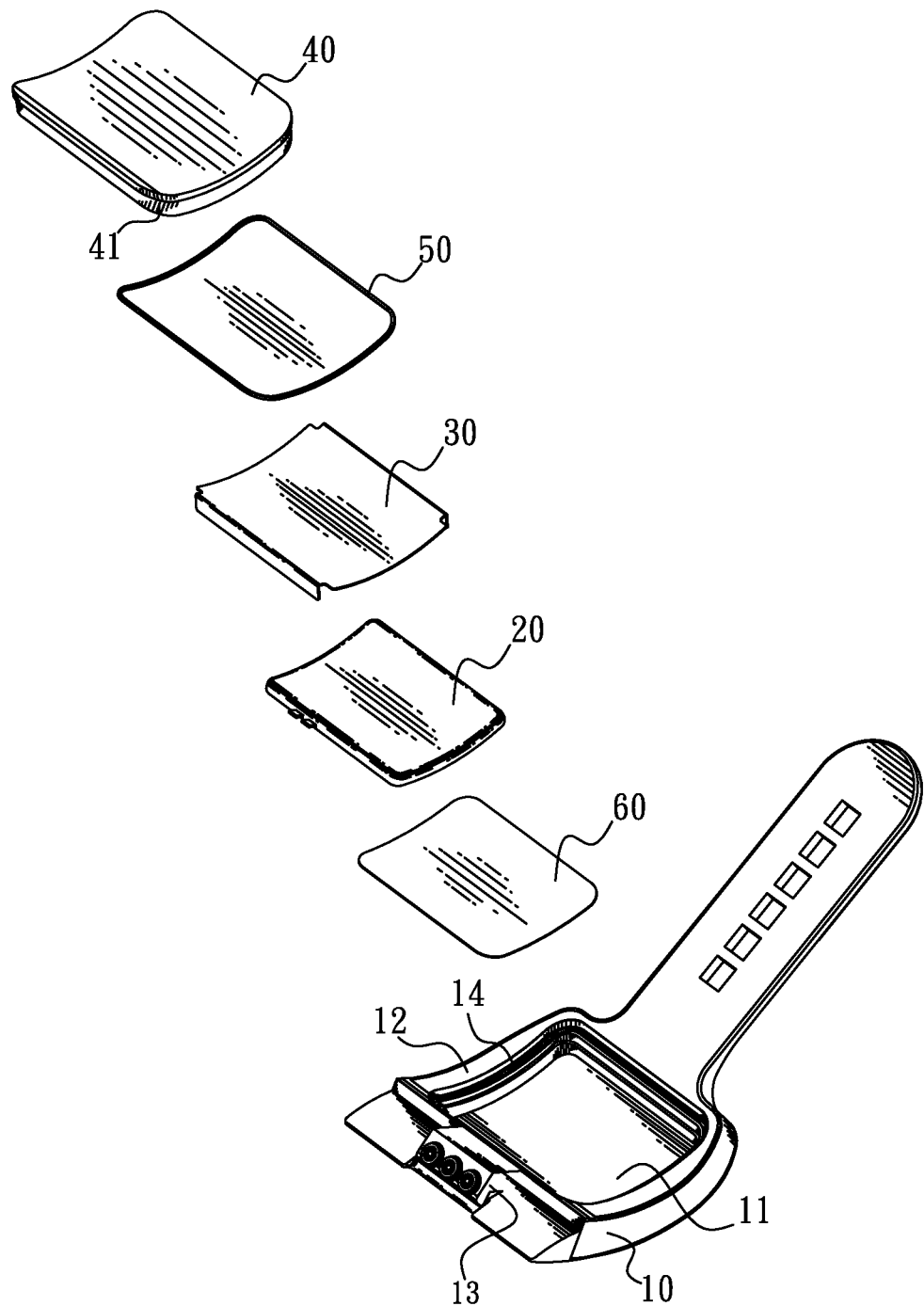
FIG. 1 is an exploded perspective view of a power supply device according to an embodiment of the present invention.
Figure 2:
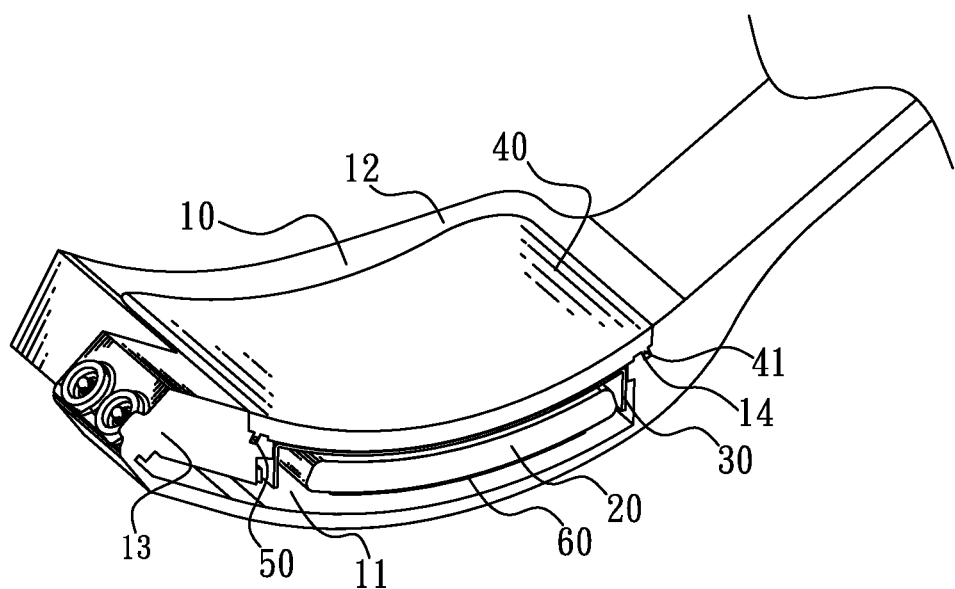
FIG. 2 is an assembled perspective view of the power supply device of FIG. 1.

Referring to FIG. 1 and FIG. 2, a power supply device 1 in accordance with an embodiment of the present invention is adapted to supplying power for an electronic product (not shown). The power supply device 1 includes a main body 10, a battery 20, a metallic plate 30, a cover 40 and a metallic ring 50, wherein the battery 20 and the metallic plate 30 are disposed in the main body 10 and covered by the cover 40, and the metallic ring 50 is positioned between the cover 40 and the main body 10.

The main body 10 is of a flexible strip body and adapted for being worn on the human body. The main body 10 defines a receiving cavity 11 therein. An inner face of the main body 10 abutting against the human body is designated as a contact surface 12 which is a curved surface in this embodiment. The receiving cavity 11 is open through the contact surface 12 to form an opening (not labeled). The main body 10 is provided with a connecting element 13 of which one end is exposed in the receiving cavity 11 and the other end is exposed outside the main body 10. The main body 10 preferably is made of rubber, but also is made of plastic material, such as polyurethane.

The connecting element 13 is used to connect the battery 20 and the electronic product, so that the electronic product can additionally get power from the battery 20 except its own power. So the electronic product has a longer standby time. The connecting element 13 also could be disposed in the cover 40 in other embodiments. The electrical connection between the connecting element 13 and the electronic product can be realized by USB connectors or pogo pin connectors, and the mechanism connection between the connecting element 13 and the electronic product can be achieved by buckling structures such as buckling blocks and buckling grooves. Certainly, the realization of the connection is not limited to the foregoing methods.

The battery 20 is a thin type battery in this embodiment, and disposed in the receiving cavity 11 of the main body 10. The battery 20 is electrically connected with the connecting element 13. The metallic plate 30 is disposed in the receiving cavity 11 of the main body 10 and parallel covers the battery 20. The cover 40 is disposed at the opening of the receiving cavity 11 and seals up the receiving cavity 11 of the main body 10 to retain the metallic plate 30 and the battery 20 in the receiving cavity 11. The outer face of the cover 40 opposite to the metallic plate 30 is a curved surface and is abreast with the contact surface 12 of the main body 10.

The metallic ring 50 is mounted around the opening of the receiving cavity 11 and positioned between the cover 40 and the main body 10. The metallic ring 50 is heated by the high-frequency heating for fusion of the cover 40 and the main body 10. In this embodiment, the assembly of the cover 40 and the main body 10 is achieved by the snap-fit of a snapping rib 41 and a snapping slot 14. In detail, the snapping rib 41 is protruded on the inner face of the cover 40 against the metallic plate 30 and is close to the peripheral edge of the cover 40, and the snapping slot 14 is opened by the contact surface 12 being concaved inward and around the opening of the receiving cavity 11. The metallic ring 50 is firstly mounted in the snapping slot 14 of the main body 10 and then positioned by the snapping rib 41 of the cover 40. Therefore, after the metallic ring 50 is heated by the high-frequency heating, the snapping rib 41 of the cover 40 is fused with the sidewalls of the snapping slot 14 of the main body 10 together, so that effectively eliminates the splicing gaps between the cover 40 and the main body 10 and avoids the human sweat and moisture seeping into the receiving cavity 11.

In order to make the power supply device 1 be applied to a wearable electronic product so as to wear the wearable electronic product on the human body, the main body 10, the battery 20, the metallic plate 30 and the cover 40 are of curved shape tally with specific parts of the human body.

Moreover, for the convenience of assembly, the power supply device 1 further includes a loading plate 60 disposed in the receiving cavity 11 of the main body 10 and located between the battery 20 and the inner sidewall of the receiving cavity 11. The edges of the metallic plate 30 are bent and extend opposite to the cover 40 to connect with the loading plate 60 with through holes (not labeled) being reserved in accordance with the connecting element 13, so that the battery 20 is enclosed between the metallic plate 30 and the loading plate 60 and further can electrically connect with the connecting element 13 through the through holes. Therefore, the battery 20, the metallic plate 30 and the loading plate 60 can be combined into one unit to be directly placed in the receiving cavity 11 of the main body 10 in assembly, and then fixed in the receiving cavity 11 by adhesive. So a steady structure can be achieved by the power supply device 1.

Figure 3:
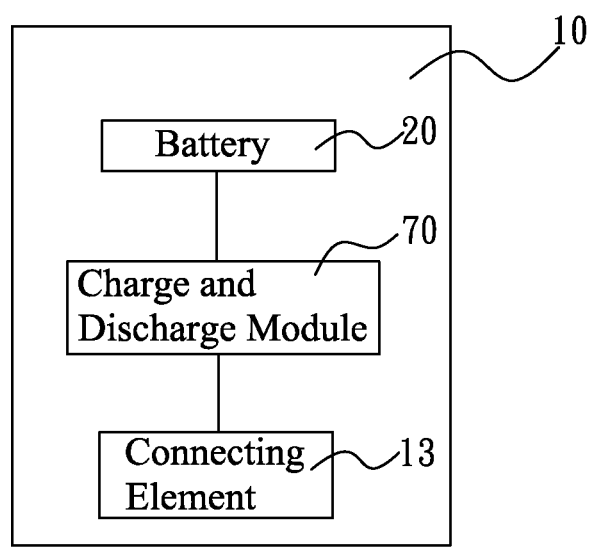
FIG. 3 is a circuit block diagram of the power supply device of FIG. 1.

Referring to FIG. 3, the power supply device 1 can be a waterproof mobile power. To fulfill this, a waterproof connector can be chosen as the connecting element 13. The connecting element 13 and the battery 20 are electrically connected with a charge and discharge module 70.

Referring to FIG. 4, a method of assembling the power supply device 1 of FIG. 1 includes the following steps.

Step 1: firstly provide the main body 10, the battery 20, the metallic plate 30 and the cover 40. Then, define the contact surface 12 of the main body 10 and form the receiving cavity 11 which is opened in the main body 10 and open through the contact surface 12. Next, equip the connecting element 13 in the main body 10 or the cover 40. Last, assemble the battery 20 and the metallic plate 30 into the receiving cavity 11 of the main body 10 and realize the electrical connection of the battery 20 and the connecting element 13.

Step 2: provide and mount the metallic ring 50 around the opening of the receiving cavity 11, and then place the cover 40 at the opening of the receiving cavity 11 to seal up the receiving cavity 11 and retain the battery 20, the metallic plate 30 and the metallic ring 50.

Step 3: heat the metallic ring 50 by the high-frequency heating to fuse the cover 40 and the main body 10 together so as to completely seal up the battery 20 in the receiving cavity 11, wherein the metallic plate 30 is between the battery 20 and acting parts by the high-frequency heating for separating the energy of the high-frequency heating and avoiding the battery 20 being damaged by the energy from the high-frequency heating.

Referring to FIG. 5, preferably, in the step 1, further provide the loading plate 60 and assemble the battery 20 between the loading plate 60 and the metallic plate 30 into one unit, then place the one unit in the receiving cavity 11 of the main body 10 and further adhere the one unit in the receiving cavity 11 by adhesive, wherein the battery 20 is electrically connected with the connecting element 13 through the loading plate 60 and the metallic plate 30.

As described above, the power supply device 1 of the present invention utilizes the high-frequency heating to heat the metallic ring 50 for fusion of the cover 40 and the main body 10 close to the metallic ring 50 so as to completely seal up the battery 20 in the main body 10, so that can achieve an excellent waterproof effect. In order to overcome the damage from the energy of the high-frequency heating on the battery 20, the metallic plate 30 is located between the battery 20 and the acting parts by the high-frequency heating to separate the energy of the high-frequency heating. Moreover, the metallic plate 30 can strengthen the power supply device 1 to improve security of the power supply device 1 when carrying.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:
1. A power supply device adapted for supplying power for an external electronic product, comprising:
   a main body defining a receiving cavity therein, an inner face of the main body being designated as a contact surface through which the receiving cavity is open to form an opening;
   a battery disposed in the receiving cavity of the main body;
   a metallic plate disposed in the receiving cavity of the main body and covering the battery;
   a metallic ring mounted around the opening of the receiving cavity; and
   a cover disposed at the opening of the receiving cavity of the main body, the metallic ring being positioned between the cover and the main body and heated by high-frequency heating for fusion of the cover and the main body to seal up the battery in the receiving cavity,
   wherein the metallic plate is located between the battery and acting parts by the high-frequency heating to separate energy of the high-frequency heating from the battery, the main body or the cover is provided with a connecting element of which one end is exposed in the receiving cavity to electrically connect the battery and the other end is exposed outside the power supply device to electrically connect the external electronic product; and
   wherein the main body is of a flexible strip body and adapted for being worn on a human body, the contact surface of the main body is a curved surface suitable for the human body, and an outer face of the cover opposite to the metallic plate is a curved surface and is abreast with the contact surface of the main body.

2. The power supply device as claimed in claim 1, wherein the power supply device further includes a loading plate disposed in the receiving cavity of the main body and located between the battery and an inner sidewall of the receiving cavity, edges of the metallic plate are bent and extend opposite to the cover to connect with the loading plate, and the battery is enclosed between the metallic plate and the loading plate.

3. The power supply device as claimed in claim 2, wherein the battery, the metallic plate and the loading plate are combined into one unit to be directly placed in the receiving cavity of the main body in assembly, and then fixed in the receiving cavity by adhesive.

4. The power supply device as claimed in claim 1, wherein the connecting element and the battery are electrically connected with a charge and discharge module.

5. A power supply device adapted for supplying power for an external electronic product, comprising:
   a main body defining a receiving cavity therein, an inner face of the main body being designated as a contact surface through which the receiving cavity is open to form an opening;
   a battery disposed in the receiving cavity of the main body;
   a metallic plate disposed in the receiving cavity of the main body and covering the battery;
   a metallic ring mounted around the opening of the receiving cavity; and
   a cover disposed at the opening of the receiving cavity of the main body, the metallic ring being positioned between the cover and the main body and heated by high-frequency heating for fusion of the cover and the main body to seal up the battery in the receiving cavity,
   wherein the metallic plate is located between the battery and acting parts by the high-frequency heating to separate energy of the high-frequency heating from the battery, the main body or the cover is provided with a connecting element of which one end is exposed in the receiving cavity to electrically connect the battery and the other end is exposed outside the power supply device to electrically connect the external electronic product; and
   wherein the main body, the battery, the metallic plate and the cover are of curved shape tally with specific parts of a human body for wearing the external electronic product on the human body.

6. A method of assembling a power supply device, comprising the steps:
   providing a main body, a battery, a metallic plate and a cover, defining a contact surface of the main body and forming a receiving cavity in the main body and an opening through the contact surface, equipping a connecting element in the main body or the cover, assembling the battery and the metallic plate into the receiving cavity with the battery electrically connecting with the connecting element;
   providing and mounting a metallic ring around the opening of the receiving cavity, and then placing the cover at the opening of the receiving cavity to seal up the receiving cavity and retain the battery, the metallic plate and the metallic ring; and
   heating the metallic ring by high-frequency heating to fuse the cover and the main body together to seal up the battery in the receiving cavity, wherein the metallic plate is located between the battery and acting parts by the high-frequency heating to separate energy of the high-frequency heating from the battery;
   wherein the main body is of a flexible strip body and adapted for being worn on a human body, the contact surface of the main body is a curved surface suitable for the human body, and an outer face of the cover opposite to the metallic plate is a curved surface and is abreast with the contact surface of the main body.

7. The method as claimed in claim 6, further comprising the step of providing a loading plate and assembling the battery between the loading plate and the metallic plate into one unit, then placing the one unit in the receiving cavity of the main body.

8. A method of assembling a power supply device, comprising the steps:
   providing a main body, a battery, a metallic plate and a cover, defining a contact surface of the main body and forming a receiving cavity in the main body and an opening through the contact surface, equipping a connecting element in the main body or the cover, assembling the battery and the metallic plate into the receiving cavity with the battery electrically connecting with the connecting element;
   providing and mounting a metallic ring around the opening of the receiving cavity, and then placing the cover at the opening of the receiving cavity to seal up the receiving cavity and retain the battery, the metallic plate and the metallic ring; and
   heating the metallic ring by high-frequency heating to fuse the cover and the main body together to seal up the battery in the receiving cavity, wherein the metallic plate is located between the battery and acting parts by the high-frequency heating to separate energy of the high-frequency heating from the battery;
   wherein the assembly of the cover and the main body is achieved by snap-fitting of a snapping rib which is protruded on an inner face of the cover and is close to a peripheral edge of the cover, and a snapping slot which is opened by the contact surface of the main body being concaved inward and around the opening of the receiving cavity, and the metallic ring is mounted in the snapping slot of the main body and positioned by the snapping rib of the cover to fuse the snapping rib of the cover with sidewalls of the snapping slot of the main body together after the metallic ring is heated by the high-frequency heating.

9. A power supply device adapted for supplying power for an external electronic product, comprising:
- a main body defining a receiving cavity therein, an inner face of the main body being designated as a contact surface through which the receiving cavity is open to form an opening;
- a battery disposed in the receiving cavity of the main body;
- a metallic plate disposed in the receiving cavity of the main body and covering the battery;
- a metallic ring mounted around the opening of the receiving cavity; and
- a cover disposed at the opening of the receiving cavity of the main body, the metallic ring being positioned between the cover and the main body and heated by high-frequency heating for fusion of the cover and the main body to seal up the battery in the receiving cavity, wherein the metallic plate is located between the battery and acting parts by the high-frequency heating to separate energy of the high-frequency heating from the battery, the main body or the cover is provided with a connecting element of which one end is exposed in the receiving cavity to electrically connect the battery and the other end is exposed outside the power supply device to electrically connect the external electronic product; and wherein the assembly of the cover and the main body is achieved by snap-fitting of a snapping rib which is protruded on an inner face of the cover and is close to a peripheral edge of the cover, and a snapping slot which is opened by the contact surface of the main body being concaved inward and around the opening of the receiving cavity, and the metallic ring is mounted in the snapping slot of the main body and positioned by the snapping rib of the cover to fuse the snapping rib of the cover with sidewalls of the snapping slot of the main body together after the metallic ring is heated by the high-frequency heating.

* * * * *